US012606886B2

(12) United States Patent
Marston et al.

(10) Patent No.: US 12,606,886 B2
(45) Date of Patent: Apr. 21, 2026

(54) PROCESS AND CIRCUIT FOR DIRECT LITHIUM EXTRACTION

(71) Applicant: ILIAD IP COMPANY, LLC, Carlsbad, CA (US)

(72) Inventors: Charles R. Marston, Midland, MI (US); Aaron Philip Poon, Tustin, CA (US); Brenda Henderson, Yuma, AZ (US); Saul Andres Lopez Ortiz, Herber, CA (US); Tristan Kareem Torres, Calexico, CA (US)

(73) Assignee: ILiAD IP Company, LLC, Carlsbad, CA (US)

( * ) Notice: Subject to any disclaimer, the term of this patent is extended or adjusted under 35 U.S.C. 154(b) by 5 days.

(21) Appl. No.: 19/219,703

(22) Filed: May 27, 2025

(65) Prior Publication Data

US 2025/0283195 A1　　Sep. 11, 2025

Related U.S. Application Data

(63) Continuation-in-part of application No. 18/933,978, filed on Oct. 31, 2024.

(Continued)

(51) Int. Cl.
　*C22B 26/12*　　　(2006.01)
　*B01D 15/10*　　　(2006.01)
　(Continued)

(52) U.S. Cl.
　CPC ............ *C22B 26/12* (2013.01); *B01D 15/102* (2025.01); *B01D 15/422* (2013.01); (Continued)

(58) Field of Classification Search
　CPC .. C22B 26/12; C22B 3/02; C22B 3/24; C22B 3/42; B01D 15/102; B01D 15/422; B01D 15/424; B01J 20/08; Y02P 10/20
　(Continued)

(56) References Cited

U.S. PATENT DOCUMENTS

2007/0068873 A1　　3/2007　Oroskar et al.
2013/0001168 A1　　1/2013　Joon-Soo et al.
(Continued)

FOREIGN PATENT DOCUMENTS

CN　　　1511964　A　　7/2004
EP　　　3086874　B1　　11/2018
(Continued)

OTHER PUBLICATIONS

International Search Report and Written Opinion dated Sep. 5, 2025 from the ISA/EPO for related PCT Patent Application No. PCT/US2025/031053.
(Continued)

*Primary Examiner* — Danielle M. Carda
(74) *Attorney, Agent, or Firm* — Crowe & Dunlevy, P.C.

(57) ABSTRACT

A process and circuit for direct lithium extraction (DLE) from natural or synthetic lithium-bearing solutions is disclosed, utilizing an alumina-based lithium selective adsorbent. The process circuit employs a monovalent salt wash solution, such as sodium chloride (NaCl) or potassium chloride (KCl), to displace impurities (e.g., boron, calcium, magnesium) from the adsorbent, followed by elution with water or a dilute salt solution to recover lithium. The process circuit improves the lithium-to-impurity ratio in the eluate, reduces operational and capital expenditures, and minimizes waste by recycling displaced impurities into the brine feed stream.

17 Claims, 8 Drawing Sheets

Related U.S. Application Data

(60) Provisional application No. 63/604,057, filed on Nov. 29, 2023.

(51) Int. Cl.

| | | |
|---|---|---|
| *B01D 15/42* | (2006.01) | |
| *B01J 20/08* | (2006.01) | |
| *C22B 3/02* | (2006.01) | |
| *C22B 3/24* | (2006.01) | |

(52) U.S. Cl.
CPC ............ *B01D 15/424* (2013.01); *B01J 20/08* (2013.01); *C22B 3/02* (2013.01); *C22B 3/24* (2013.01)

(58) Field of Classification Search
USPC .......................................................... 75/743
See application file for complete search history.

(56) References Cited

U.S. PATENT DOCUMENTS

| | | |
|---|---|---|
| 2013/0108527 A1 | 5/2013 | Uehara |
| 2018/0245180 A1 | 8/2018 | Cheng et al. |
| 2018/0345244 A1* | 12/2018 | Boualleg ................ C01D 15/00 |
| 2019/0248667 A1* | 8/2019 | Featherstone ........ B01D 15/361 |
| 2019/0256368 A1 | 8/2019 | Marston et al. |
| 2023/0019776 A1 | 1/2023 | Bishkin |
| 2024/0183002 A1 | 6/2024 | Li et al. |

FOREIGN PATENT DOCUMENTS

| | | |
|---|---|---|
| WO | 2012163791 A1 | 12/2012 |
| WO | 2023040534 A1 | 3/2023 |
| WO | 2023192810 A1 | 10/2023 |
| WO | 2025155342 A1 | 7/2025 |

OTHER PUBLICATIONS

International Search Report and Written Opinion dated Mar. 7, 2025 from the ISA/EPO for related PCT Patent Application No. PCT/US2024/053996.

Wu , et al., "Lithium aluminum-layered double hydroxide chlorides (LDH): Formation enthalpies and energetics for lithium ion capture", J. Am. Ceram. Soc. 2019;102:2398-2404.

* cited by examiner

PROCESS AND CIRCUIT FOR DIRECT LITHIUM EXTRACTION

CROSS-REFERENCE TO RELATED APPLICATIONS

This application claims priority to and is a continuation-in-part of U.S. patent application Ser. No. 18/933,978 filed Oct. 31, 2024, which claims the benefit of U.S. Provisional Patent Application No. 63/604,057 filed Nov. 29, 2023, and incorporates each of these applications by reference in its entirety into this document as if fully set out at this point.

BACKGROUND OF THE INVENTION

1. Field of the Invention

The present disclosure relates to direct lithium extraction (DLE) technologies, specifically to methods for improving the purity of lithium eluate by removing impurities through salt displacement techniques.

2. Description of the Related Art

The global demand for lithium, driven by its importance in battery technologies, has led to significant advancements in direct lithium extraction (DLE) systems. These systems are designed to recover lithium from brine feedstocks, which are often rich in various salts and impurities. Despite their ability to target lithium, DLE processes face ongoing challenges related to the carryover of impurities such as boron, calcium, magnesium, potassium, manganese, and zinc into the eluate. These impurities, originating from the complex composition of brine matrices, can negatively impact the quality of the lithium eluate and complicate subsequent processing steps.

Conventional methods for removing impurities in DLE systems include precipitation softening, ion exchange, and solvent extraction. While these techniques are widely used, they are often associated with significant inefficiencies and high costs. For instance, precipitative softening requires the addition of chemical reagents, which increases operational expenditure (OPEX) and generates waste streams that require further treatment. On the other hand, ion exchange and solvent extraction involve complex equipment and processes, resulting in higher capital expenditure (CAPEX) and maintenance costs. Moreover, these methods frequently fail to achieve the high levels of purity required for battery-grade lithium, necessitating additional purification steps that further increase costs and reduce overall process efficiency.

Moreover, while alumina-based adsorbents are known to selectively adsorb lithium ions from solutions at a moderate pH (e.g., 5-7), multivalent ions, such as sulfate anions, inhibit the deintercalation of lithium ions from alumina-based adsorbents, thereby strongly limiting the reversible lithium loading capacity. Under normal deintercalation conditions using water or dilute salt solutions as an eluant, alumina-based adsorbents loaded by adsorption of lithium from highly concentrated brines with primarily multivalent anions, release only about 40% to about 50% of the adsorbed lithium ions, making alumina-based adsorbents generally uneconomical and ineffective in lithium recovery from sulfate-containing solutions.

SUMMARY OF THE INVENTION

The disclosure relates to a process and circuit for recovering lithium from a lithium-bearing natural or synthetic solution having a high concentration of multivalent salt anions, such as sulfate, by contacting the solution with an alumina-based lithium selective adsorbent using continuous countercurrent adsorption and desorption. In this embodiment, the inventive DLE process circuit displaces the lithium-bearing solution with a monovalent salt solution to initiate a metathesis reaction and then deintercalates the formed LiCl with water or a dilute salt solution. The invention provides a circuit and process that allows the ready release of lithium ions from the LADH adsorbent to levels equivalent to those observed in chloride-containing solutions.

The disclosure also relates to a process and circuit for enhancing the purity of a lithium eluate in a DLE process circuit. In this embodiment, the DLE process circuit displaces residual impurities with a monovalent wash solution that includes an effective amount of a chloride salt. The inventive DLE process circuit then displaces the chloride wash solution with an eluate solution to concurrently recover lithium and further purify the recovered eluate, yielding a lithium eluate with an increased lithium-to-impurity ratio. At least a portion of the displaced chloride salt wash solution containing the displaced impurities can be recycled back into a brine feed stream or to another process circuit.

The described method is particularly advantageous in reducing capital expenditure (CAPEX), operational expenditure (OPEX), and chemical costs associated with downstream processing while also improving the lithium-to-impurity ratio in the eluate. This advancement represents a significant step forward in the field of DLE technologies, enabling the production of high-purity lithium for use in battery applications and other industries.

In one embodiment, a process for direct lithium extraction is disclosed. The process involves feeding a lithium-bearing feed solution, containing lithium ions and residual impurities, into a direct lithium extraction process circuit comprising multiple process zones. The feed solution is contacted with an alumina-based lithium selective adsorbent in an adsorption loading zone to form a lithium-loaded adsorbent bed. Residual impurities are then displaced from the bed using a chloride salt wash solution, such as one containing sodium chloride, potassium chloride, or a blend thereof, in a salt wash displacement zone. After the salt wash solution is displaced from the adsorbent bed by an eluate solution in a lithium product elution zone, lithium is recovered, and the recovered eluate is purified to yield a lithium eluate having an increased lithium-to-impurity ratio. At least a portion of the displaced salt wash solution containing the residual impurities is recycled into the process circuit.

In an embodiment, the process includes further steps whereby the feed solution is displaced from the adsorbent bed into a vessel using a lithium-containing eluant solution, followed by further displacement of impurities using the salt wash solution, forming a combined feed solution that is passed through the adsorption loading zone for a predetermined contact time to substantially load the adsorbent bed. A latent eluate solution is then displaced from the bed using a strip displacement step in which a lithium strip solution flows through the elution zone to strip additional lithium ions, and a portion of the eluate with an increased lithium-to-impurity ratio is collected.

In an embodiment, the feed solution may be derived from natural or synthetic sources, including continental, geothermal, salar, or oil field brines; seawater; salt lake brines; leachates from ores or mining processes; battery recycling streams; and combinations thereof.

In an embodiment, the chloride salt wash solution comprises from about 5% to about 31% (or, in certain instances, about 10% to about 30%) sodium chloride, potassium chloride, or a blend, with specific embodiments providing a range of about 5% to about 27 wt % sodium chloride and about 5% to about 31 wt % potassium chloride.

In an embodiment, the process may further incorporate monitoring of parameters such as solution concentration, conductivity, pressure, temperature, column performance, and pH, or a combination thereof.

In an embodiment, the DLE process circuit may include a continuous countercurrent adsorption-desorption or continuous countercurrent ion exchange process circuit with optional pre-treatment and/or post-processing circuits.

In another embodiment, a system for direct lithium extraction is presented. The system comprises a direct lithium extraction circuit that includes an adsorption loading zone for selectively loading lithium ions and residual impurities onto an alumina-based adsorbent; a salt displacement zone configured to deliver a chloride salt wash solution that displaces the residual impurities from the loaded adsorbent bed; and an elution zone that supplies an eluate solution to displace the salt wash solution, thereby deintercalating lithium to produce a lithium eluate with an increased lithium-to-impurity ratio. The system further features a recycle zone for reclaiming at least a portion of the displaced chloride salt wash solution, which contains impurities, and a control system arranged to monitor process parameters and regulate fluid flows throughout the circuit.

In an embodiment, the direct lithium extraction process circuit is a continuous countercurrent adsorption-desorption or continuous countercurrent ion exchange system and may include a rotary multiport valve.

In an embodiment, a pre-treatment circuit is provided upstream of the extraction circuit, and a post-processing circuit is provided downstream of the extraction circuit.

In an embodiment, the chloride salt wash solution is formulated with from about 5% to about 31% (and in some cases from about 10% to about 30%) sodium chloride, potassium chloride, or a blend—with some embodiments specifying a range of about 5% to about 27 wt % sodium chloride and about 5% to about 31 wt % potassium chloride.

In an embodiment, the system may arrange the process zones sequentially, with the salt displacement zone comprising adsorbent beds configured as one to five sets, a brine displacement zone with beds in one to five sets, an adsorption loading zone with beds arranged in one to six sets, a strip displacement zone with beds arranged in one to three sets, and a lithium product elution zone with beds arranged in one to four sets, which may be configured as monads, dyads, triads, tetrads, pentads, hexads, or a combination thereof.

BRIEF DESCRIPTION OF THE DRAWINGS

The above and other objects and advantages of this invention may be more clearly seen when viewed in conjunction with the accompanying drawing wherein.

DETAILED DESCRIPTION OF THE INVENTION

Figure 1:
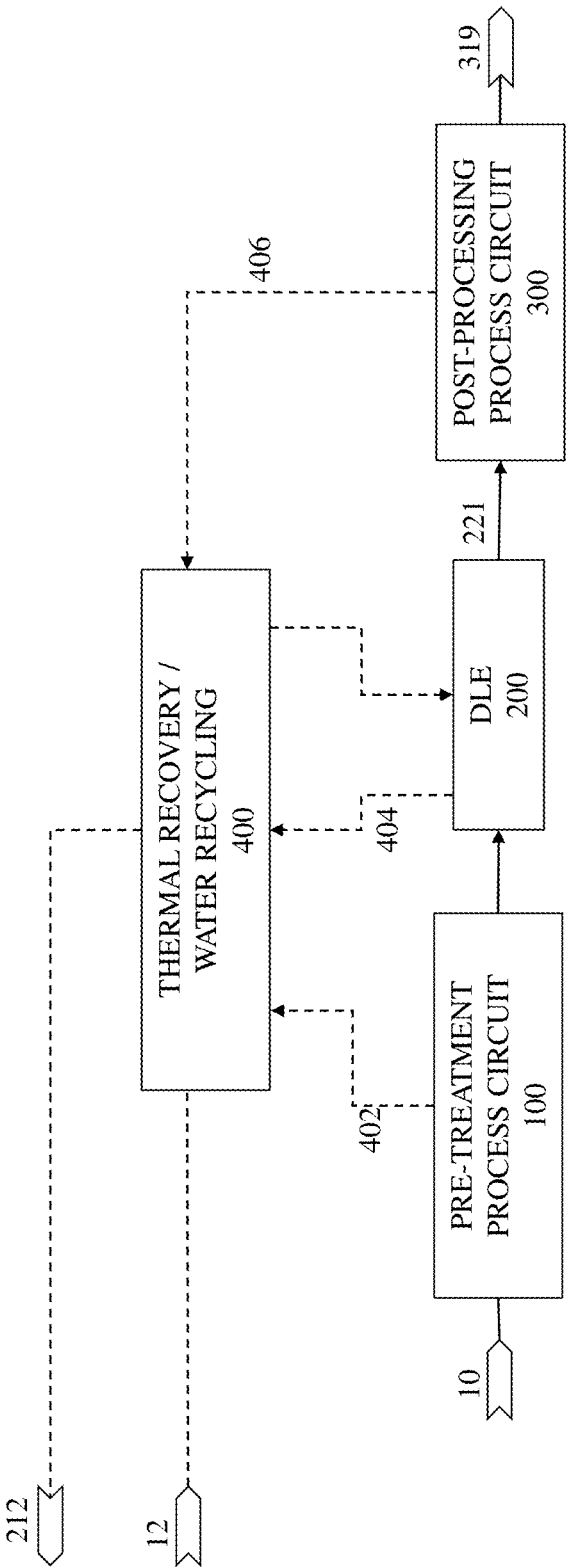
FIG. 1 is a process flow diagram of an example of a direct lithium extraction flowsheet with heat recovery and water recycling in accordance with an illustrative embodiment of the invention disclosed herein.

The detailed description provides illustrative embodiments of the disclosed subject matter, which generally pertains to processes and circuits for direct lithium extraction (DLE) and impurity removal from lithium-bearing solutions. The disclosed subject matter is particularly relevant to the field of lithium recovery technologies, including methods for enhancing the purity of lithium eluates. While specific examples, configurations, and operational parameters are described herein, these are intended solely to illustrate the principles of the disclosed subject matter and are not to be construed as limiting the scope of the described processes and circuits. The disclosed subject matter encompasses various modifications, substitutions, and rearrangements that would be apparent to those skilled in the art, and such variations are considered within the scope of the claims.

The invention generally relates to a process and circuit for DLE from natural and synthetic lithium-bearing solutions using an alumina-based lithium selective adsorbent. During DLE, lithium ions load selectively and in high capacity into the alumina-based lithium selective adsorbent.

As noted above, deintercalation of an alumina-based lithium selective adsorbent with water or dilute salt solutions can be inhibited by intercalated multivalent anions in sulfate-containing brines or feedstock solutions, and in such cases, the inventive process and circuit can employ mass action of highly concentrated chloride solution to displace sulfate from the alumina-based lithium selective adsorbent. The inventive process and circuit displace the sulfate/multivalent salt-containing brines or feedstock solution with a monovalent salt solution to initiate a metathesis reaction of intercalated lithium sulfate salts to lithium chloride salts. The monovalent salt species can include sodium chloride (NaCl), and/or potassium chloride (KCl) at high concentrations (e.g., about 5% to about 31% salt and any range or value therebetween).

For chloride/monovalent salt-containing brines or feedstock solutions, the inventive process and circuit can include a salt displacement zone that utilizes a monovalent salt solution to displace impurities (e.g., boron, calcium, magnesium, potassium, manganese, and zinc) from one or more loaded absorbent beds. The monovalent salt solution can include sodium chloride (NaCl) (e.g., about 5% to about 27% NaCl solution) (and any range or value therebetween) and/or potassium chloride (KCl) at high concentrations (e.g., about 5% to about 31% KCl solution) (and any range or value therebetween). The inventive process and circuit then displace the monovalent salt solution from the brine-loaded adsorbent beds with water or a dilute lithium solution.

In this aspect, the inventive process and circuit leverage the high osmotic salt solution to displace residual impurities from the alumina-based lithium selective absorbent media in the adsorbent beds. The displacement solution with impurities can be sent to a salt solution vessel and/or recycled back into the feed streams, minimizing waste and resource consumption.

A concentrated KCl or NaCl stream will be dosed into the salt solution vessel to maintain the concentration of the displacement brine and provide a makeup solution for any losses that occur during the process. The displacement solution has a minimal impact on the raw feed brine composition and minimizes the dilution effect typically experienced with standard brine displacement using DLE eluate. In addition, the inventive process and circuit improve the lithium-to-impurity ratio in the eluate, reduce the need for additional downstream purification steps (e.g., softening and ion exchange to remove hardness ions), and optimize water and chemical usage, offering a technically efficient and cost-effective solution for producing high-purity lithium.

The DLE process circuit selectively extracts lithium ions directly from lithium-bearing solutions using advanced technologies like adsorption, ion exchange, solvent extraction, or membrane operations. For example, the DLE process circuit can utilize lithium selective adsorbent media to selectively extract lithium ions from the lithium-bearing solution. The DLE process circuit can operate in a fixed bed, simulated moving bed, continuous countercurrent ion exchange (CCIX) (e.g., U.S. Patent Application Publication No. US20190248667A1), or continuous countercurrent adsorption desorption (CCAD) (e.g., U.S. Patent Application Publication No. US20190256368A1) configuration, where fresh lithium-bearing solution interacts with the adsorbent media, ensuring efficient lithium extraction. During the desorption phase, a chloride salt solution is used to remove residual impurities, including calcium and magnesium, before an eluent is employed to release lithium ions from the adsorbent media, resulting in a concentrated lithium chloride (LiCl) eluate.

The DLE process circuit 200 can include a multi-port distribution manifold (e.g., a valve tree) or valve (e.g., rotary, multiport valve) system fluidly coupled with the adsorption beds or columns containing the lithium selective adsorbent. The rotary, multiport valve system can have flow channels configured within one or more internal revolving discs that are fluidly coupled with the adsorption beds or columns. The multiport valve system includes one or more drive motors and controllers. In addition, the multi-port distribution manifold or valve system can include connecting, feed, and discharge pipes, tanks, flow and level controls, and pumps (such as pressure booster pumps) fluidly connected to the manifold or valve system and in fluid communication with the revolving process disks and flow channels. Fluid flow through the DLE process circuit 200 can be controlled by pumping flow rates and/or predetermined indexing of a rotary, multiport valve system, adsorbent beds, or both.

The lithium-bearing solution can be one or a blend of natural or synthetic lithium-bearing brines or solutions from any resource, such as a continental brine, a geothermal brine, a salar brine, an oil field or produced water brine, seawater, a salt lake brine, brine or leachate solutions from dissolved salts, ore, hard rock, spodumene, clay, or other lithium mining and beneficiation, solutions from battery recycling processes, mother liquors, pregnant leach or liquor solutions (PLS), or a combination or blend thereof.

Clay deposits, spodumene, and other hard rock minerals can be beneficiated by crushing and grinding, thermally treated to convert the material to a more reactive phase, and/or chemically leached using a suitable leaching fluid (e.g., acid leach or solvent leach).

Solar evaporation is one of the most widely used methods for lithium extraction, particularly in South America's lithium-rich salars (salt flats). The solar evaporation process involves pumping lithium-rich brine into evaporation ponds, where sunlight and wind gradually evaporate the water, leaving behind concentrated lithium salts. Solar evaporation is an inefficient process that loses roughly 50% of the lithium as brine moves from pond to pond. This loss occurs due to saturation limits at each stage, where solids are concentrated or removed to create a brine stream with the necessary lithium concentration for conversion into lithium carbonate.

DLE can be integrated as a retrofit or add-on to existing solar evaporation sites. Adsorption-Al-based DLE results in some water loss, which becomes part of the depleted brine. Lithium-bearing solutions can be prepared by re-dissolving salts into the depleted brine and reprocessing it through the DLE process circuit, thereby enhancing lithium recovery and improving yield. If the raw brine is below saturation, additional salts can be introduced to supplement the brine, bringing it to or above saturation levels, thereby increasing lithium feed concentration and optimizing plant output.

Alternatively, salts can be transported to a resource site with excess water, such as a produced water facility with reinjection capabilities. At this location, treated produced water—post oil extraction but before reinjection—can be mixed with these salts until near saturation, creating a lithium-enriched stream suitable for DLE. This approach is particularly effective when the produced water has a lower total dissolved solids (TDS) content of about 5% to about 10%, as it enhances osmotic force and improves adsorption-based DLE efficiency. Additionally, leveraging the infrastructure of a produced water site, including electricity, fuel gas, and water resources, provides economic advantages for lithium extraction, helping to offset the costs of transporting salt.

Solutions from battery recycling processes can be prepared by chemically leaching shredded battery material with an acidic (e.g., hydrochloric acid) or alkaline solution (e.g., sulfuric acid) to dissolve the lithium-containing materials. Alternatively, the shredded battery material can be subjected to electrochemical leaching to convert lithium sulfate to lithium hydroxide in a controlled reactor or selective alkaline pressure leaching using a high-concentration alkaline (e.g., sodium hydroxide) on lithium iron phosphate (LiFePO$_4$) cathodes.

The lithium-bearing solution can be passed directly to the DLE process circuit with no or minimal pre-treatment, but some brines or feedstocks may require one or more pre-treatment processes to maximize the effectiveness of the DLE process circuit, especially if impurities originate from non-ionic sources such as natural organic matter (NOM), hydrocarbons, oil, suspended solids, etc. For example, the lithium-bearing solution can be subjected to impurity removal to remove unwanted elements like magnesium, calcium, and hydrocarbons, such as by flashing and/or precipitation to remove heavy metals and scaling compounds (e.g., U.S. Patent Application Publication Nos. US20190248667A1 and US20190256368A1), selective ion exchange to selectively bind lithium ions, filtration and/or clarification to remove suspended solids and organic matter, chemical conditioning to enhance lithium separation efficiency by pH adjustments and reagent additions, reverse osmosis or membrane separation to remove unwanted salts from the brine or feedstock solution, or a combination of these pre-treatment processes.

Figure 3:
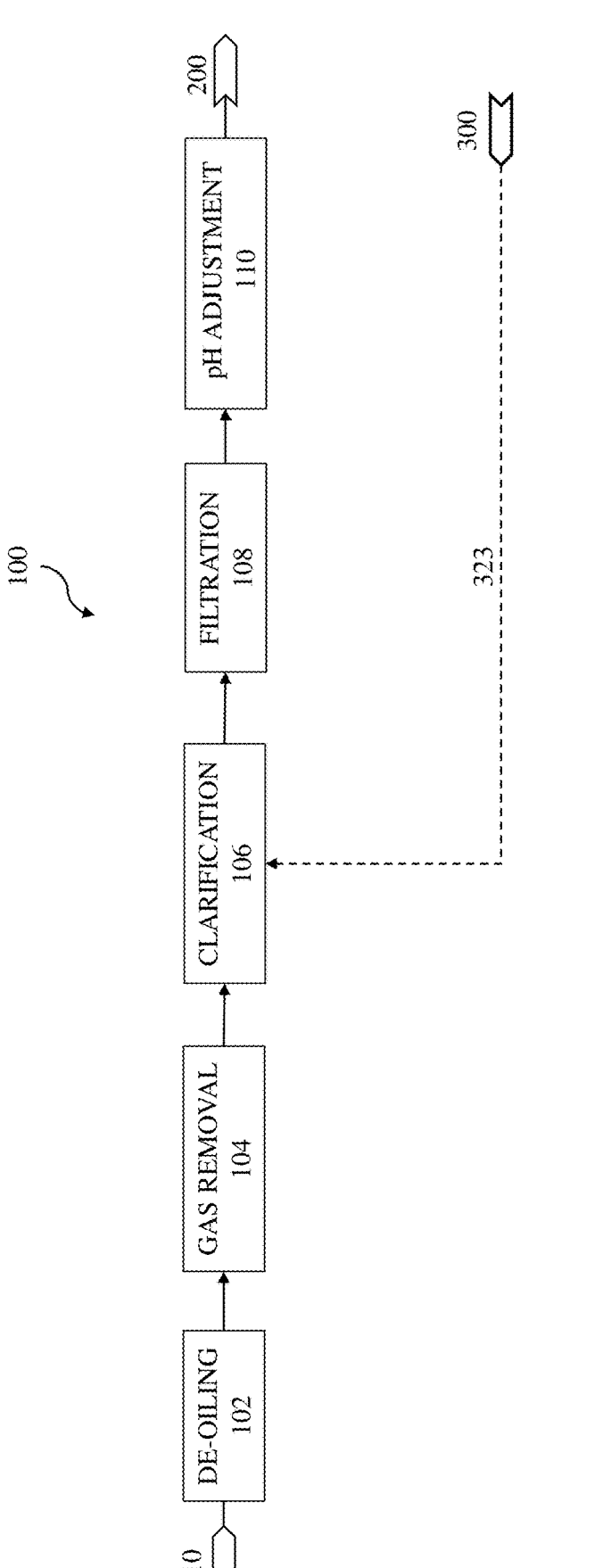
FIG. 3 is a process flow diagram of an example of a pre-treatment process circuit in accordance with an illustrative embodiment of the invention disclosed herein.

Depending on the lithium resource, the lithium-bearing solution may also be de-oiled to remove hydrocarbons and/or degassed to remove dissolved gases, such as hydrogen sulfide. As illustrated in FIG. 3, the brine or feedstock solution 10 could be de-oiled 102 using mechanical/density-based separation, such as using three-phase separators to efficiently separate oil, water, and solids by gravity settling, skim/surge tanks to allow oil to float to the surface for collection, and/or corrugated or tilted plate interceptors (CPIs/TPIs) to enhance gravity separation by using plates to coalesce oil droplets. The feedstock solution 10 could also be de-oiled 102 using assisted separation using air/gas or media, such as hydrocyclones to separate oil droplets from water, induced gas flotation (IGF), or dissolved gas flotation (DGF) that introduce gas bubbles to help lift oil droplets to the surface for removal, and/or nutshell or media filtration that use specialized media to adsorb oil and remove fine contaminants. Chemical additives can be used to enhance separation efficiency, such as reverse demulsifiers to break down stable water-in-oil emulsions and free trapped oil, and coagulants and flocculants to aggregate fine oil droplets and suspended solids, thereby facilitating more efficient separation. Depending on the feedstock solution quality and process circuit requirements, one or more of these methods can be implemented for optimal de-oiling.

Hydrogen sulfide (H₂S) and other non-condensable gas removal 104 may be necessary depending on the site and brine or feedstock solution 10 conditions. The feedstock solution 10 could be degassed 104 using gas stripping (air, fuel gas, steam, or other gas), flash removal, biological removal (e.g., sulfur-oxidizing bacteria), amine separation (e.g., using monoethanolamine (MEA), diethanolamine (DEA), and methyldiethanolamine (MDA)), or an oxidation method (chemical (e.g., chlorine, hydrogen peroxide, ferric sulfate), ozone, or air) to remove H₂S. The removal of sulfides can be determined by the levels in the brine or feedstock solution 10 and a cost-benefit analysis, considering the lower costs associated with safety operations, procedures, and construction materials (due to sulfide corrosion), as well as the feasibility of the process. If sulfide removal is not performed, it can be mitigated using blanketed and swept tanks, positive pressure systems, and area gas detection for operator areas.

If large solids or rocks are present, they may settle during de-oiling 102 and within bulk tanks, where process units separate floating oil from solids. These solids can be managed through tank maintenance, periodic removal of bottom sludge, or solid eductors that jet solids out of the system. Targeted removal methods include hydrocyclones, clarification settling, or media filtration.

Desanding can be integrated with mother liquor recycle clarification 106, where a mother liquor purge stream 323, which is high in sodium (Na), lithium (Li), and carbonation, is recycled from the post-processing process circuit 300 to the pre-treatment process circuit 100. This recycling process typically precipitates calcium (Ca), magnesium (Mg), and other ions, reducing alkalinity and lowering pre-DLE acidification costs. Additionally, it returns a portion of post-processing lithium purge into the system for recovery, typically contributing about 5% to about 15% of the downstream lithium feed, depending on process conditions and DLE eluate quality.

Solids removal can be achieved using a solids contact clarifier, rapid rate clarifier, or assisted clarifier with air, sand, or other density-assisted media. As noted above, chemical additives can be introduced to promote coagulation and flocculation, ensuring efficient solids separation.

After bulk solids removal and clarification 106, media filtration or other fine-particle filtration 108 is used to further purify the brine or feedstock solution for DLE. This step removes suspended solids that could otherwise become entrained in the DLE media bed. Typically, multi-media filters are employed, though various alternatives can be used depending on process requirements, such as mono-media filtration, sand filtration, membrane filtration, cartridge filtration, self-backwashing filters, crossflow filtration, upflow or downflow filtration, and leaf or pre-coat filtration. In some cases, a dual-step approach may be implemented, incorporating nutshell media filtration for final de-oiling polishing alongside particle filtration to ensure optimal brine quality before DLE processing. If needed, the pH of the final de-oiling, polished, and filter solution can be adjusted 110 before flowing to the DLE process circuit 200.

If the feedstock solution contains low total dissolved solids (TDS) or lithium concentrations (e.g., less than about 150 ppm lithium), the lithium-bearing solution can be pre-concentrated before the DLE process circuit, such as by distillation, evaporation, membrane separation, reverse osmosis, or the like. If the feedstock solution contains high TDS or lithium concentrations, the lithium-bearing solution can be pre-treated by dilution or selective removal of competing ions (e.g., calcium, magnesium).

For chloride-based brines or feedstock solutions, the lithium-bearing solution can generally contain a minimum of about 8% TDS and up to about 32% TDS for sodium chloride (NaCl)-based brines, up to about 52% TDS for magnesium chloride (MgCl₂)-based brines, and up to about 74% TDS for calcium chloride (CaCl₂)-based brines (and any value or range therebetween).

For sulfate-based brines or feedstock solutions, the lithium-bearing solution generally has high concentrations of sulfate salts of sodium, potassium, and calcium, such as having about 15% to about 25% sulfate concentration (and any range or value therebetween) or having a concentration greater than about 25,000 mg/kg, or, more particularly, between about 50,000 mg/kg and about 150,000 mg/kg (and any range or value therebetween) of the multivalent salt.

The lithium concentration in the lithium-bearing solution depends on the resource, but it can range from about 40 mg/kg up to about 10,000 mg/kg lithium (and any value or range therebetween). The temperature of the lithium-bearing solution is also resource dependent, but it can be between 5° C. and about 105° C. (preferably about 35° C. to about 75° C.) (and any value or range therebetween). The pH of the lithium-bearing solution can be between about 4.5 and about 7.0 (preferably between about 5.0 and about 6.0) (and any value or range therebetween), and the pH can be adjusted using any suitable acid (e.g., HCl or H₂SO₄). If sulfuric acid is used to adjust/maintain the pH, it can be added prior to filtration to capture calcium precipitates.

Adsorption- and ion exchange-based DLE can utilize lithium selective absorbent media to selectively extract lithium ions from the lithium-bearing solution. The lithium selective adsorbent media can be a lithium aluminum double hydroxide (LADH), such as lithium aluminum layered double hydroxide chloride (LiXAl$_2$(OH)$_6$CL$_X$), Gibbsite-based (or Gibbsite's common polymorphs, e.g., Bayerite, Boehmite, and Nordstrandite) lithium aluminum layered double hydroxide, lithium aluminum intercalate (LiAl$_2$ (OH)$_6$Cl) crystals in macroporous, polymeric resin beads or other suitable adsorbent support. The lithium selective adsorbent can also be a lithium alumina intercalate prepared from hydrated alumina, a layered double hydroxide modified activated alumina, a layered double hydroxide imbibed ion exchange resin or copolymer or molecular sieve or zeolite, layered aluminate polymer blends, a lithium manganese oxide, a titanium oxide, an immobilized crown ether, metal organic framework, or a combination thereof.

In adsorption-Al-based DLE, lithium ions intercalate into the surface of solid particles, typically aluminum-based sorbents. Meanwhile, ion exchange-based DLE involves swapping lithium ions in a liquid phase with ions of the positive charge but different chemical properties, e.g., H$^+$, on a solid ion exchanger, mainly manganese and titanium-based sorbents. Aluminum-based sorbent DLE eliminates the need for acid washing during stripping and base usage for post-processing and neutralization compared to ion-exchange-based DLE, thus providing lower OPEX and less waste. In addition, water, heat, and other process streams in aluminum-based sorbent DLE can be recycled within a closed-loop system.

Figure 2:
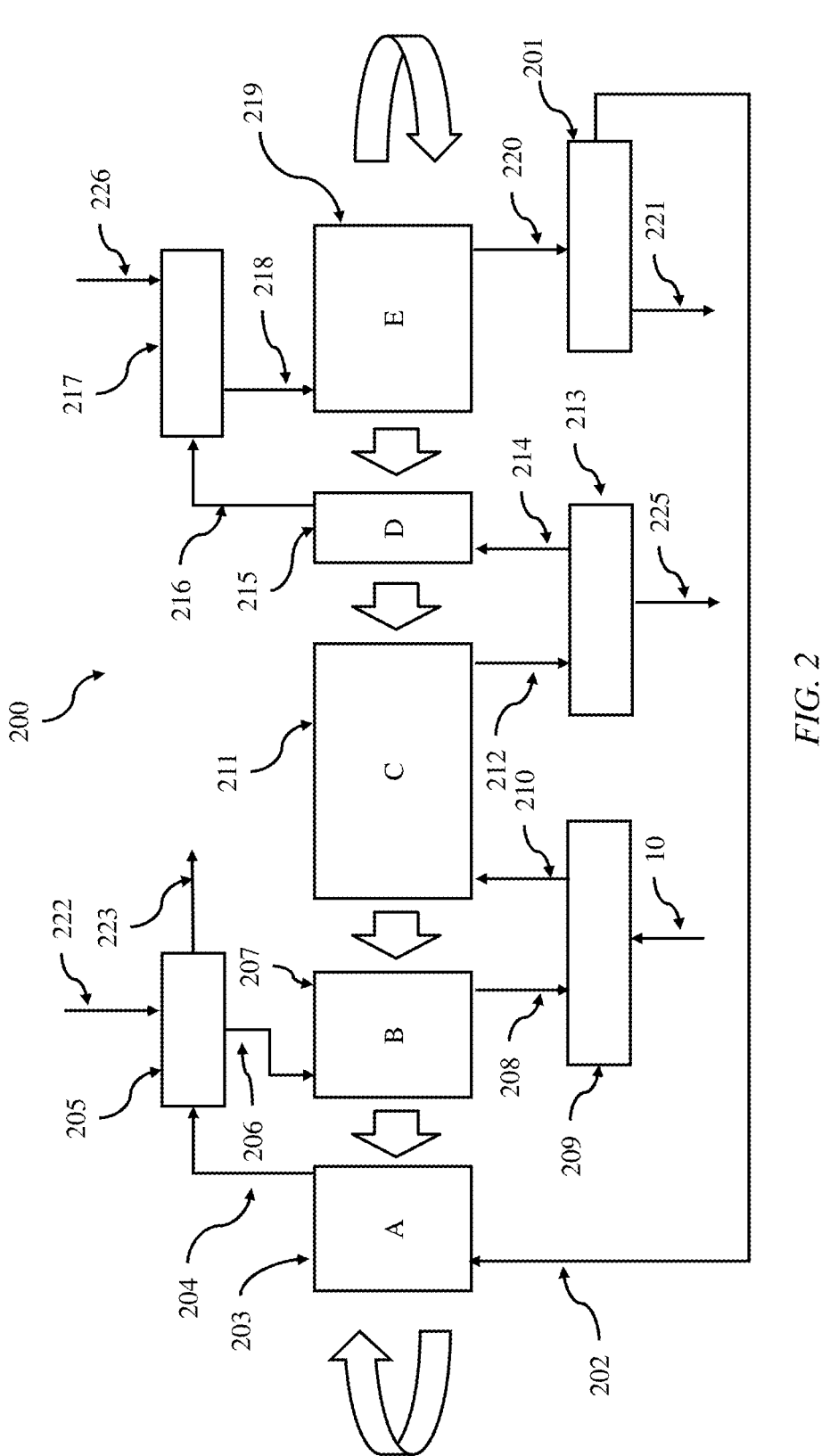
FIG. 2 is a process diagram of an example of a DLE process circuit in accordance with an illustrative embodiment of the invention disclosed herein.

As exemplified in FIG. 2, the DLE process circuit is a CCAD process circuit 200 having a plurality of adsorption beds or columns, each containing the alumina-based lithium selective adsorbent. The adsorption beds are sequentially subjected to individual process zones as part of the DLE process circuit 200. Each process zone includes one or more adsorbent beds configured in parallel, in series, or a combination of parallel and series, flowing in an up-flow mode, a down-flow mode, or a combination of modes. Fluid flow through the DLE process circuit 200 can be controlled by pumping flow rates and/or predetermined indexing of a rotary, multiport valve system, adsorbent beds, or both, creating a process where the adsorption beds continually cycle through the individual process zones.

The lithium-bearing solution flows countercurrently to the advance of the adsorption beds, and lithium ions bind selectively to the adsorbent media. A controlled flow of an eluant (e.g., a lithium strip solution) 202 is introduced countercurrently into the process zone advance to displace bound lithium chloride from the adsorbent media to produce a DLE process circuit product eluate 221. The eluant/lithium strip solution 218 comprises a low-concentration lithium product eluant (as neutral salts, generally lithium chloride) in water at a concentration from about 0 mg/kg to about 1000 mg/kg lithium (and any value or range therebetween) and at temperatures of about 45° C. to about 105° C. (preferably about 75° C.) (and any value or range therebetween).

As exemplified in FIG. 2, the CCAD process circuit 200 includes a monovalent or chloride wash displacement zone A, a brine displacement zone B, one or more brine or lithium loading zone C, a strip displacement zone D, and one or more lithium product elution or strip zones E. The loading zone C can include a break tank and booster pump. In addition, an adsorbent bed(s) 219 in the loading zone C can be configured for up-flow (or in down-flow and up-flow modes if a break tank and booster pump are utilized) and can be configured as monads, dyads, triads, tetrads, pentads, hexads, or a combination thereof (preferably hexads or above for low lithium brines (<150 ppm Li), triads, quads, or hexads for mid lithium brines (150 ppm to 600 ppm Li), and monads, dyads, and triads for high lithium brines (>600 ppm Li)) (or any value or range therebetween) in a series of 1, 2, 3, 4, 5, or 6 adsorbent column sets. An adsorbent bed(s) 215 in the strip displacement zone D can be configured in an up-flow mode and can be configured as monads in a series of 1, 2, or 3 adsorbent columns. An adsorbent bed(s) 211 in the elution or strip zone E can be configured in a down-flow mode and can be configured as monads, dyads, triads, or a combination thereof in a series of 1, 2, 3, or 4 adsorbent bed sets. An adsorbent bed(s) 207 in the brine displacement zone B can be configured in a down-flow mode and include monads in a series of 1, 2, 3, 4, or 5 adsorbent bed sets. The monovalent or chloride wash displacement zone A replaces one (1) or more of the adsorbent beds in the brine displacement zone B. The adsorbent bed(s) 203 in the monovalent or chloride wash displacement zone A can be configured in a down-flow mode and as monads or dyads in a series of 1, 2, 3, 4, or 5 absorbent bed sets. A portion of the high lithium concentration product eluate 202 is pumped from a lithium product vessel 201 in the lithium product strip zone E to the adsorbent bed(s) 203 in the monovalent displacement zone A. The elution volume of high lithium concentration product eluate 202 drawn from the product strip zone E is at least enough to displace one adsorbent bed void fraction 204 during an index time (the time interval between rotary valve indexes) from the adsorbent bed(s) 203 to a monovalent/salt solution vessel 205 in the monovalent displacement zone A. The index time can be between about 1 minute and about 12 minutes (preferably about 6 minutes for low lithium (<150 ppm) brines, about 9 for mid lithium (150-600 ppm) brines, or about 12 minutes for high lithium (>600 ppm) brines) (and any value or range therebetween).

For sulfate/multivalent salt-based brines or solutions, a monovalent salt wash solution 206 of about 10% to about 30% sodium chloride (NaCl) or potassium chloride (KCl) (or any value or range therebetween) is supplied from the salt solution vessel 205 to displace bound multivalent ions, e.g., sulfate anions, by initiating a salt metathesis of bound lithium sulfate and/or lithium sodium sulfate to lithium chloride in an adsorbent bed(s) 207 in the brine displacement zone B.

For chloride/monovalent salt-based brines or solutions, a monovalent salt wash solution 206 of about 5% to about 27% NaCl or about 5% to about 31% KCl (and any range or value therebetween) and at temperatures of about 15° C. to about 75° C. (preferably between about 25° C. and about 60° C.) (and any value or range therebetween) is supplied from the monovalent solution vessel 205 to displace impurities (e.g., boron, calcium, magnesium, potassium, manganese, and zinc) from one or more loaded adsorbent bed(s) 207 in the brine displacement zone B. The high osmotic salt solution can be generated from various sources, including concentrated and purified feed brine, post-processing concentrated salt stream recirculation, solid makeup salt, purified salts from downstream processing, intermediates, or a combination thereof.

A monovalent solution makeup-up 222 can be fluidly connected to the vessel 205, and optionally, a monovalent solution bleed 223 can be pumped from the vessel 205 to a combined feed solution vessel 209. An elution volume of lithium-bearing solution 208 is displaced from the adsorbent bed(s) 207 in the brine displacement zone B to the combined feed solution vessel 209.

The lithium-bearing solution 10 is supplied to the combined feed solution vessel 209. The combined feed solution 210 is pumped from the vessel 209 to the adsorbent bed(s) 211 in the loading zone C with a predetermined contact time sufficient to completely or almost completely load or exhaust the lithium selective adsorbent in the adsorbent bed(s) 211. The loading zone C is sized such that under the steady-state operation of the DLE process circuit 200, the complete lithium adsorption mass transfer zone is captured within the loading zone C. The lithium-depleted, high multivalent raffinate 212 exiting the loading zone C is sent to a depleted, high multivalent raffinate vessel 213. The steady-state operation achieves maximum lithium loading without significant lithium leaving with the lithium-depleted raffinate 212 as tails.

A portion of the lithium-depleted, high multivalent raffinate 225 is pumped from the vessel 213 to be returned to the brine aquifer, e.g., via reinjection, and another portion of the raffinate 214 is pumped from the vessel 213 to the adsorbent bed(s) 215 in the strip displacement zone D to displace latent eluate solution 216, which is carried forward as entrained fluid within the adsorbent bed(s) 215 transitioning from the zone A is enough fluid to completely displace salts from the adsorbent bed(s) 203 before the adsorbent bed(s) 219 enters the lithium strip zone E. This means that the displaced lithium-bearing solution 208 may be recycled into the combined feed solution vessel 209 and introduced to the adsorbent bed(s) 211 in the loading zone C with the lithium-bearing solution 10. Depending on the tuning parameters of the DLE process circuit 200, the low lithium concentration in the recycled displacement feed solution 208 could significantly increase the effective concentration of lithium entering the loading zone C. This enhanced feed concentration yields a significantly increased lithium capacity and improved lithium recovery efficiency, particularly in cases where the feed solution has a low lithium concentration (below 200 mg/kg).

The invention disclosed significantly improves impurity removal from alumina-based lithium selective adsorbents using a chloride wash solution. By configuring the DLE process circuit with a chloride wash displacement zone, impurity removal was improved as illustrated in Table 1 below:

TABLE 1

| Species | As | B | Ba | Ca | K | Li | Mg | Mn | Na | Si | Sr | Zn |
|---|---|---|---|---|---|---|---|---|---|---|---|---|
| Standard Product (ppm) | 3 | 200 | 1 | 500 | 100 | 1800 | 2 | 150 | 200 | 3 | 3 | 35 |
| NaCl Wash Product (ppm) | 3 | 69 | 0 | 93 | 17 | 1743 | 1 | 28 | 135 | 0 | 1 | 30 |
| Improvement (%) | 0.0 | 65.5 | 100.0 | 81.4 | 83.0 | 3.2 | 50.0 | 81.3 | 32.5 | 100.0 | 66.7 | 14.3 | strip displacement zone D into the adsorbent bed(s) 219 in the lithium product strip zone E in the cyclic process, back to the inlet of the product strip zone E. The elution volume of the displacement raffinate 214 drawn from the vessel 213 to displace latent eluate solution 216 to a lithium product strip vessel 217 is at least enough to displace one adsorbent bed(s) 215 void fraction during the rotary valve index time in the strip displacement zone D.

A lithium strip solution makeup-up 226 can be fluidly connected to the lithium product strip vessel 217. An eluant (lithium strip solution) 218 is pumped from the lithium product strip vessel 217 countercurrent to the process zone advance (fluid flow is illustrated as right to left, while the process zone movement is illustrated as left to right) into an adsorbent bed(s) 219 in the lithium strip zone E to produce an enhanced lithium product stream 220. The lithium strip solution 218 comprises a low-concentration lithium product eluant (as neutral salts, generally lithium chloride) in water, with a concentration ranging from about 0 mg/kg to about 1000 mg/kg of lithium, and at temperatures of about 5° C. to about 100° C. Properly tuned, the DLE process circuit 200 recovers between about 90% and about 97% of the lithium from the feed solution and produces the enhanced lithium chloride product stream 220 having a concentration 10- to 50-fold that of the feed solution with a greater than 99.9% rejection of hardness ions and most other solution components. The enhanced lithium product stream 220 is pumped from the adsorbent bed(s) 219 in the lithium strip zone E to the lithium product vessel 201.

The portion of high lithium concentration product eluate 202 that is recycled and displaces the monovalent salt solution 206 from the monovalent salt solution displacement Although the lithium concentration is lower, the reduction in impurities is significant, and the process circuit can be optimized to reduce impurities in the eluate further.

The expected ranges of the substances provided in the above effluent composition table are applicable when the sum of Na, Ca, K, Zn, Mn, and B (in Na equivalents) ("Sum") has a Li/Na-equivalent ratio ("Li/NA Ratio") greater than (>) 1.0. Note that 1 mole of B is equivalent to 1 mole of Na for calculation purposes. If one or more of the substances in Table 1 above fail to satisfy the expected range in Table 1 above for such substance(s), the Sum and Li/Na Ratio can be recalculated.

TABLE 2

| | Standard Product Example | | | |
|---|---|---|---|---|
| Example | Effluent Composition (mg/kg) | Na Equivalence (mg/kg) | Molar Weight | Equivalence Value |
| Li | 1800 | | | |
| Ca | 500 | 573.6 | 40.078 | 2.0 |
| Na | 200 | 200.0 | 22.990 | 1.0 |
| K | 100 | 58.8 | 39.098 | 1.0 |
| Zn | 35 | 24.6 | 65.390 | 2.0 |
| Mn | 150 | 125.5 | 54.938 | 2.0 |
| B | 200 | 425.3 | 10.811 | 1.0 |
| Sum | | 1407.9 | | |
| Li/Na Ratio | | 1.28 | | |

TABLE 3

| | NaCl Wash Product Example | | | |
| Example | Effluent Composition (mg/kg) | Na Equivalence (mg/kg) | Molar Weight | Equivalence Value |
|---|---|---|---|---|
| Li | 1743 | | | |
| Ca | 93 | 106.7 | 40.078 | 2.0 |
| Na | 135 | 135.0 | 22.990 | 1.0 |
| K | 17 | 10.0 | 39.098 | 1.0 |
| Zn | 30 | 21.1 | 65.390 | 2.0 |
| Mn | 28 | 23.4 | 54.938 | 2.0 |
| B | 69 | 146.7 | 10.811 | 1.0 |
| | Sum | 443.0 | | |
| | Li/Na Ratio | 3.93 | | |

The foregoing Li:Na ratio shows a three (3) times purer product in relation to lithium, which results in less post-processing reagents (salt vs. acids and alkaline solutions), more concentration in the RO process circuit (more water recovery with less energy), more concentration in the thermal process circuit (more water recovery and higher lithium recovery for conversion), and OPEX savings for the process flow sheet since softening and ion exchange process circuits can be reduced or eliminated.

Following DLE, the DLE process circuit eluate 221 undergoes post-processing to concentrate, refine, and convert the lithium salt, usually LiCl, to lithium compounds suitable for various applications, such as battery-grade lithium hydroxide and/or lithium carbonate. Additionally, post-processing ensures proper management of the depleted brine, meeting environmental regulations before being reintroduced into the environment or reinjected into the reservoir.

Figure 4:
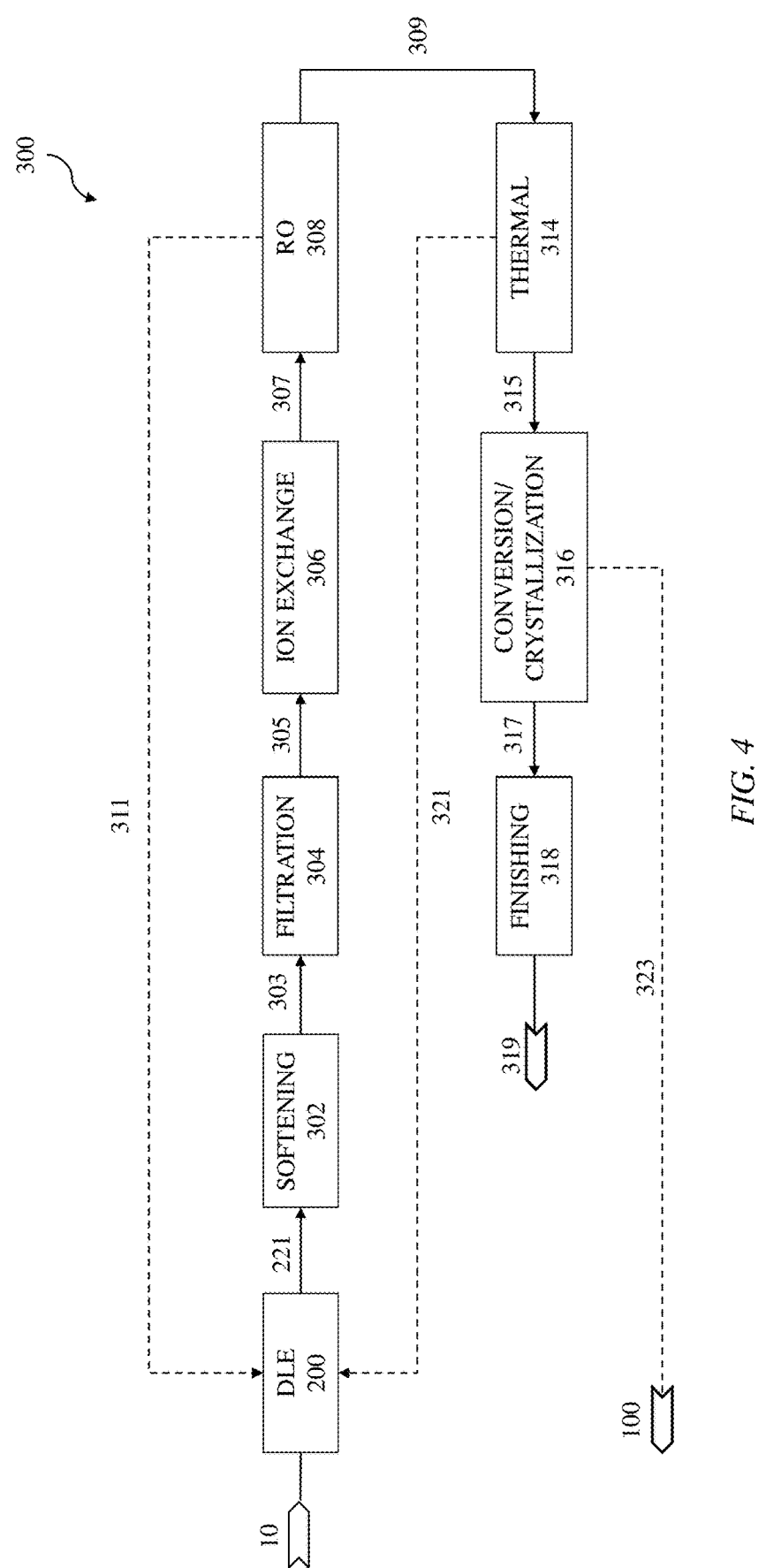
FIG. 4 is a process flow diagram of an example of a post-processing process circuit in accordance with an illustrative embodiment of the invention disclosed herein.

The post-processing process circuit 300 is configured to selectively remove impurities from the lithium chloride eluate 221 from the DLE process circuit 200. As illustrated in FIG. 4, the post-processing process circuit 300 can include a softening process circuit 302 to remove hardness ions, such as calcium and magnesium, that could precipitate and damage downstream reverse osmosis (RO) membranes. Chemical additives, such as lime ($Ca(OH)_2$) or soda ash ($Na_2CO_3$), are added to the softening process circuit 302 to chemically precipitate these ions as insoluble salts. A filtration process circuit 304 can be employed downstream of the softening process circuit 302 to remove the precipitates from a softened eluate 303, thereby mitigating scaling risks and enhancing RO membrane performance.

The filtered eluate 305 from the filtration process circuit 304 can be passed to a calcium/magnesium/boron ion exchange process circuit 306 to polish the softened, filtered eluate 305 if needed to remove trace levels of calcium, magnesium, and/or boron that remain after softening. The calcium/magnesium/boron ion exchange process circuit 306 ensures compatibility with downstream high-performance RO membranes.

The polished lithium chloride eluate 307 is directed to a reverse osmosis (RO) process circuit 308. The RO process circuit 308 separates water and impurities from the polished lithium chloride eluate 307, forming a purified lithium chloride eluate 309 with increased lithium concentrations and a permeate stream 311. The permeate stream 311 from the RO process circuit 138 can be recycled to the DLE process circuit 200 for water recovery, significantly reducing the need for additional freshwater inputs. The RO process circuit 138 can utilize any suitable industrial RO membrane for low pH environments, such as RO membranes, thin-film composite (TFC) membranes, cellulose acetate (CA) membranes, seawater RO (SWRO) membranes, brackish water RO (BWRO) membranes, ultra-low pressure (ULP) RO membranes, high-pressure RO membranes (e.g., microfiltration (MF), ultrafiltration (UF), nanofiltration (NF)), osmotically assisted RO (OARO) membranes, counter-flow RO (CFRO) membranes, potential-assisted membranes (e.g., electrodialysis (ED), bipolar, and capacitive deionization (CDI)), forward osmosis (FO) with RO hybrid membranes, or specialized acid-resistant RO membranes.

Figure 5:
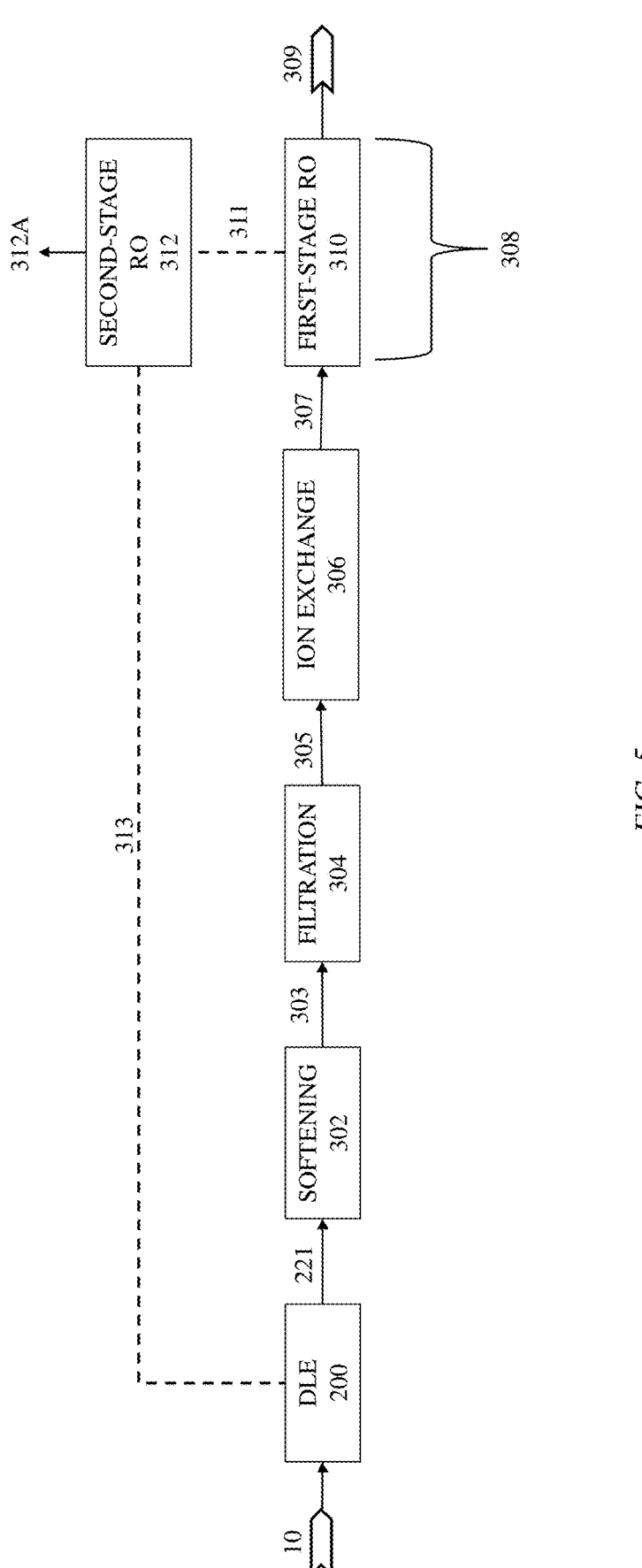
FIG. 5 is a process flow diagram of an example of a dual-stage reverse osmosis process circuit in accordance with an illustrative embodiment of the invention disclosed herein.

As exemplified in FIG. 5, the RO process circuit 138 can be configured as a two-stage boron RO process circuit, which eliminates the need for and inefficiencies associated with a boron ion exchange as part of the ion exchange process circuit 136 after softening. A first-stage RO unit 310 operates under low-pH/acidic conditions to hydraulically partition boron into a boron-laden permeate stream 311, which is directed to a downstream, second-stage RO unit 312 that operates under high-pH/alkaline conditions, converting boric acid ($H_3BO_3$) into borate ($BO_3^{3-}$) to enhance membrane rejection. The two-stage boron RO process circuit removes up to about 99% of the boron before recycling the boron-free permeate 313 from the second-stage RO unit 312 to the DLE process circuit 200.

If utilized, the polished lithium chloride eluate 137 can be directed to the first-stage RO unit 310 that operates under low-pH/acidic conditions (pH of up to about 8 or more, preferably about 6 to about 7) (and any value or range therebetween), such that boron predominantly migrates from the polished eluate 137 into the boron-laden permeate stream 311 (approximately 80-90% recovery), taking advantage of hydraulic partitioning. The pH of the feed eluate 137 can be adjusted using a suitable acid, such as a chlorine-based (e.g., hydrochloric) or a sulfur-based (e.g., sulfuric) acid. The first-stage RO unit 310 can utilize any suitable industrial RO membrane for low pH environments, such as RO membranes, thin-film composite (TFC) membranes, cellulose acetate (CA) membranes, seawater RO (SWRO) membranes, high-pressure RO membranes, osmotically assisted RO (OARO) membranes, counter-flow RO (CFRO) membranes, forward osmosis (FO) with RO hybrid membranes, or specialized acid-resistant RO membranes.

As illustrated in FIG. 5, the boron-laden permeate stream 311 proceeds from the first-stage RO unit 310 to the second-stage RO unit 312 to remove up to about 99% of the residual boron. The second-stage RO unit 312 operates under high-pH/alkaline conditions (pH of between about 10 and about 14, or more preferably between about 11 and about 12) (and any value or range therebetween) to convert boric acid ($H_3BO_3$) in the boron-laden permeate stream 311 to borate ($BO_3^{3-}$). The pH of the boron-laden permeate stream 311 can be adjusted using a suitable alkali, such as sodium hydroxide (NaOH), potassium hydroxide (KOH), or lithium hydroxide (LiOH). The second-stage RO unit 312 can utilize any suitable industrial RO membrane to convert boric acid into borate in high-pH environments, such as RO membranes, alkaline-resistant TFC membranes, brackish water RO (BWRO) membranes, ultra-low pressure (ULP) RO membranes, or specialized high-pH RO membranes.

The boron-free permeate stream 313 from the second-stage RO unit 312 is recycled to the DLE process circuit 200 for water recovery, significantly reducing the need for additional freshwater inputs. Boron-laden concentrate 312A is handled separately or subjected to additional treatment if required.

A thermal concentration process circuit 314 then concentrates the purified lithium chloride eluate 139 to evaporate water from the lithium chloride eluate 139, reaching near saturation. This is followed by the crystallization and separation of either lithium carbonate or lithium hydroxide monohydrate from the remaining concentrated lithium chloride eluate 317. The thermal concentration process circuit 314 can utilize any suitable industrial evaporator, such as thermal evaporators, multi-effect evaporators (MEE), mechanical vapor recompression (MVR) evaporators, forced circulation evaporators, falling film evaporators, flash adiabatic evaporators, or the like.

The concentrated lithium chloride eluate 315 flows downstream from the thermal concentration process circuit 314 to a conversion process circuit 316 for the production of high-purity lithium hydroxide and/or lithium carbonate. For example, the concentrated lithium chloride eluate 317 can be converted to lithium hydroxide using an electrolysis process or a chemical precipitation process (e.g., precipitation with calcium hydroxide ($Ca(OH)_2$)) or can be converted to lithium carbonate using a carbonation process (e.g., reacting with carbon dioxide ($CO_2$)) or a chemical precipitation process (e.g., precipitation with sodium carbonate ($Na_2CO_3$)). The concentrated lithium chloride eluate 317 can be sequentially converted to lithium carbonate and lithium hydroxide, such as by first converting the lithium chloride to lithium carbonate using a physical-chemical process and then converting the lithium carbonate to lithium hydroxide using another physical-chemical process. The resulting lithium hydroxide and/or lithium carbonate can be concentrated beyond saturation to produce a final battery-grade lithium product 319. The concentration process can utilize any suitable industrial crystallization technologies, such as thermal, draft tube baffle, surface cooling, forced circulation, growth, reactive, adiabatic flash, vacuum, and/or cooling crystallizers. The final lithium product is washed and separated from the saturated brine in a finishing process circuit 318 using suitable industrial filtration or separation technologies, such as a centrifuge, filter press, belt press, or a combination thereof.

Alternatively, the concentrated lithium chloride eluate 317 can be directly converted to high-purity lithium hydroxide using a direct conversion process, such as solvent extraction, electrolysis, or direct lithium conversion (DLC), which utilizes an ion exchange process to capture lithium on a resin and elute it with sodium hydroxide (NaOH). The eluted brine from this ion exchange process becomes an aqueous lithium hydroxide solution, which is then concentrated using thermal technologies to evaporate water from the solution, reaching supersaturation. The remaining aqueous lithium hydroxide solution is crystallized to produce lithium hydroxide monohydrate.

Various fluid streams, such as the RO permeate 311, process condensate 321, or mother liquor purge 323, can be recycled within each of the process circuits and between the pre-treatment circuit 100, the DLE process circuit 200, the post-processing process circuit 300, or a combination thereof. In addition to the recycled fluid streams, heat 252 can be recovered and recycled to the DLE process circuit 200.

The invention can incorporate advanced process sensors and controls to maintain system stability, enhance efficiency, and reduce energy consumption. These sensors and controls include automated systems for managing flow rates to adjust feed, product, intermediate, and recycle flow rates, optimizing recovery rates, and ensuring consistent eluate treatment. The invention can utilize other integrated/inline/real-time sensors and controllers to monitor other key parameters, such as solution concentration, conductivity, pressure, temperature, column performance, pH, or a combination thereof, of the streams before, during, and/or after each process circuit stage. These sensors and controls can also monitor specific ion concentrations within the feed, product, intermediate, and/or recycle flow streams to optimize the operation of the pre-treatment process circuit 100, the DLE process circuit 200, and/or the post-processing process circuit 300. Dosing systems precisely maintain/adjust concentrations using salts (e.g., NaCl, KCl), pH using acids (e.g., HCl, $H_2SO_4$) or alkaline reagents (e.g., NaOH), and dosing of other reagents. In addition, sensors can detect fouling or scaling on ion exchange, adsorbent media, or RO membranes, triggering automated cleaning cycles to maintain optimal performance. Automated valves and pumps can regulate fluid flow within each process circuit and between circuits, and predictive controls can automatically adjust circuit and process parameters. The advanced process sensors and controls can include suitable programmable logic controllers (PLC), supervisory control and data acquisition (SCADA), distributed control systems (DCS), or the like to manage process operations and optimize lithium recovery.

Some process streams, including certain lithium-bearing solutions, are hot and have excess heat. Before reinjection of the lithium-depleted brine 212, these streams can be cross-exchanged 400 with raw makeup water 12 or feedstock solution 10 to reduce energy consumption within the DLE process circuit 200 or for heat input into the pre-treatment process circuit 100, the DLE process circuit 200, and/or the post-processing process circuit 300. This can be a partial or slipstream 402, 404, and/or 406 due to the larger proportional flow rate of the brine or solution to the particular process circuit flow rates. If the stream is superheated, it may be flashed or exchanged upstream before the pre-treatment process circuit 100 (e.g., U.S. Patent Application Publication Nos. US20190248667A1 and US20190256368A1).

EXAMPLES

The process for the selective adsorption and desorption of lithium from natural and synthetic salt solutions using an alumina-based lithium selective adsorbent in a CCAD circuit disclosed herein is further illustrated by the following examples, which are provided for demonstration rather than limitation.

Example 1. This example demonstrates that alumina-based adsorbents strongly bind lithium ions from strong sulfate solutions but do not deintercalate (elute) lithium readily when using standard deintercalation conditions of low salt aqueous solutions.

Figure 6:
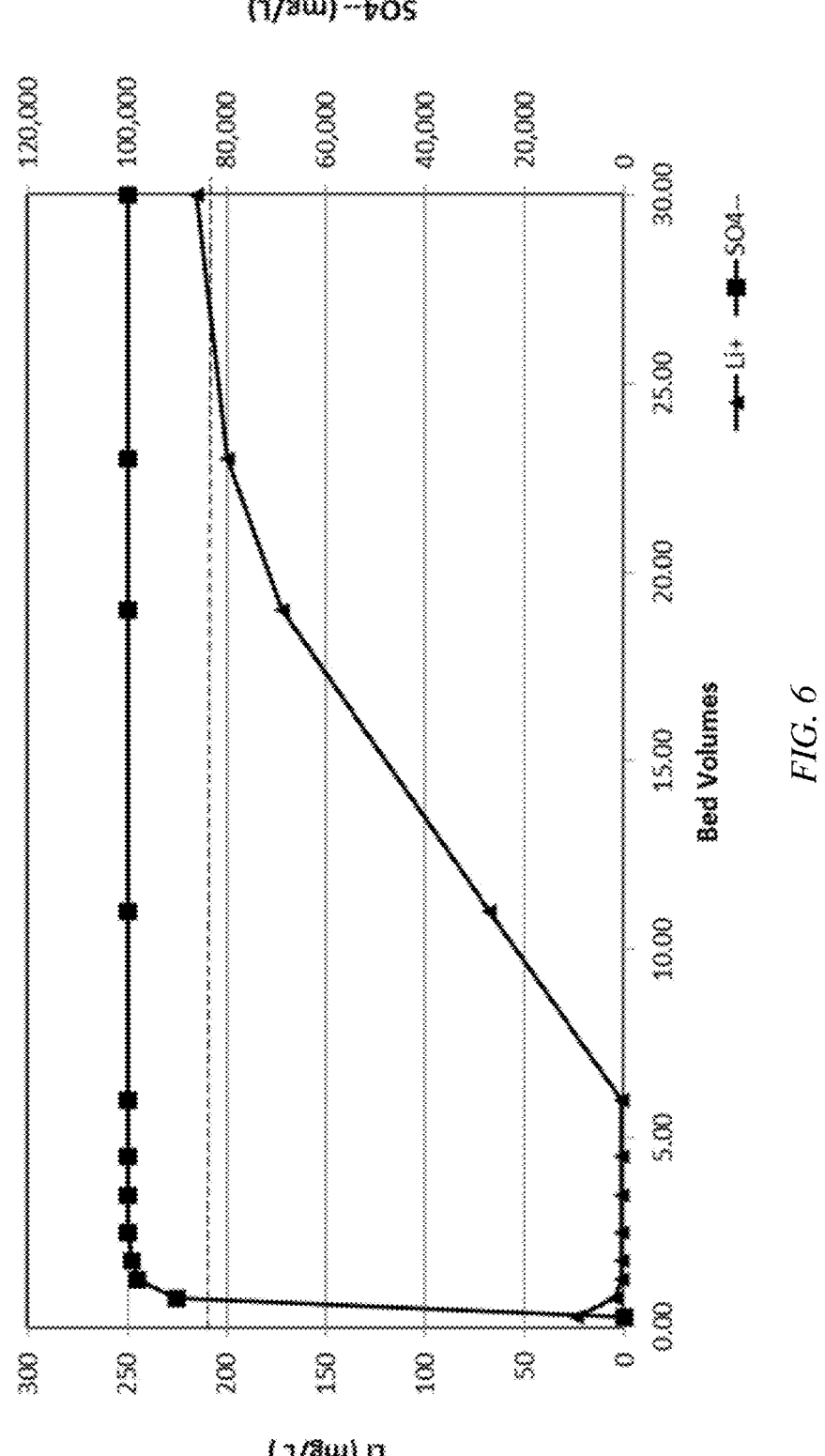
FIG. 6 graphically illustrates the alumina-based lithium loading (intercalation) curve from a lithium-bearing sodium sulfate brine.
Figure 7:
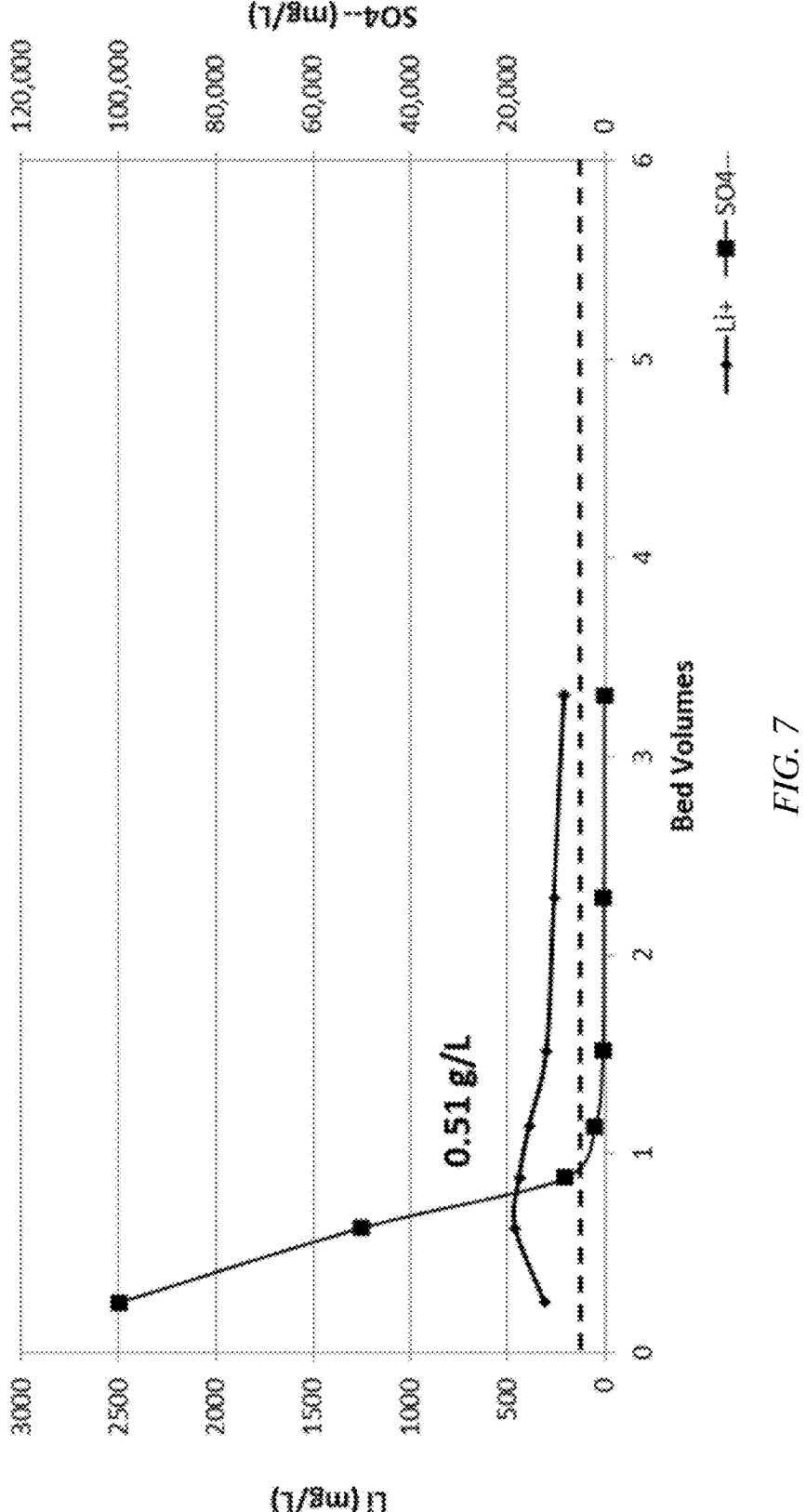
FIG. 7 graphically illustrates sulfate inhibition of lithium elution demonstrating the poor reversible lithium capacity of the alumina-based adsorbent when loaded (intercalated) with lithium from high sulfate brines.

A 1-inch diameter jacketed glass column was filled with 250 mL of a proprietary LADH lithium selective adsorbent. At 74° C., a 20% sodium sulfate (~100,000 mg/L $SO_4^{2-}$) solution containing 240 mg/L lithium as lithium chloride at 75° C. and a pH of about 5.5 was passed through the column at a flow rate of 25 mL/min (6.0 BV/hr), and the loading or intercalation curve was recorded and analyzed for lithium and sulfate. The lithium and sulfate loading curves in FIG. 6 were analyzed to show that the LADH adsorbent captured/bound lithium ions to a level of about 3 g of lithium per liter of adsorbent. After 30 bed volumes (BV) of the lithium-bearing sulfate solution, the feed was switched to water having 140 mg/kg lithium as lithium chloride at 74° C. and a flow rate of 20 mL/min (4.8 BV/hr) to strip or deintercalate the lithium and sulfate loaded LADH adsorbent. As shown in FIG. 7, the observed reversible lithium capacity was only about 0.51 g/L.

Example 2. This example demonstrates that the invention disclosed significantly improves lithium deintercalation from alumina-based lithium selective adsorbents loaded from sulfate salt solutions.

Figure 8:
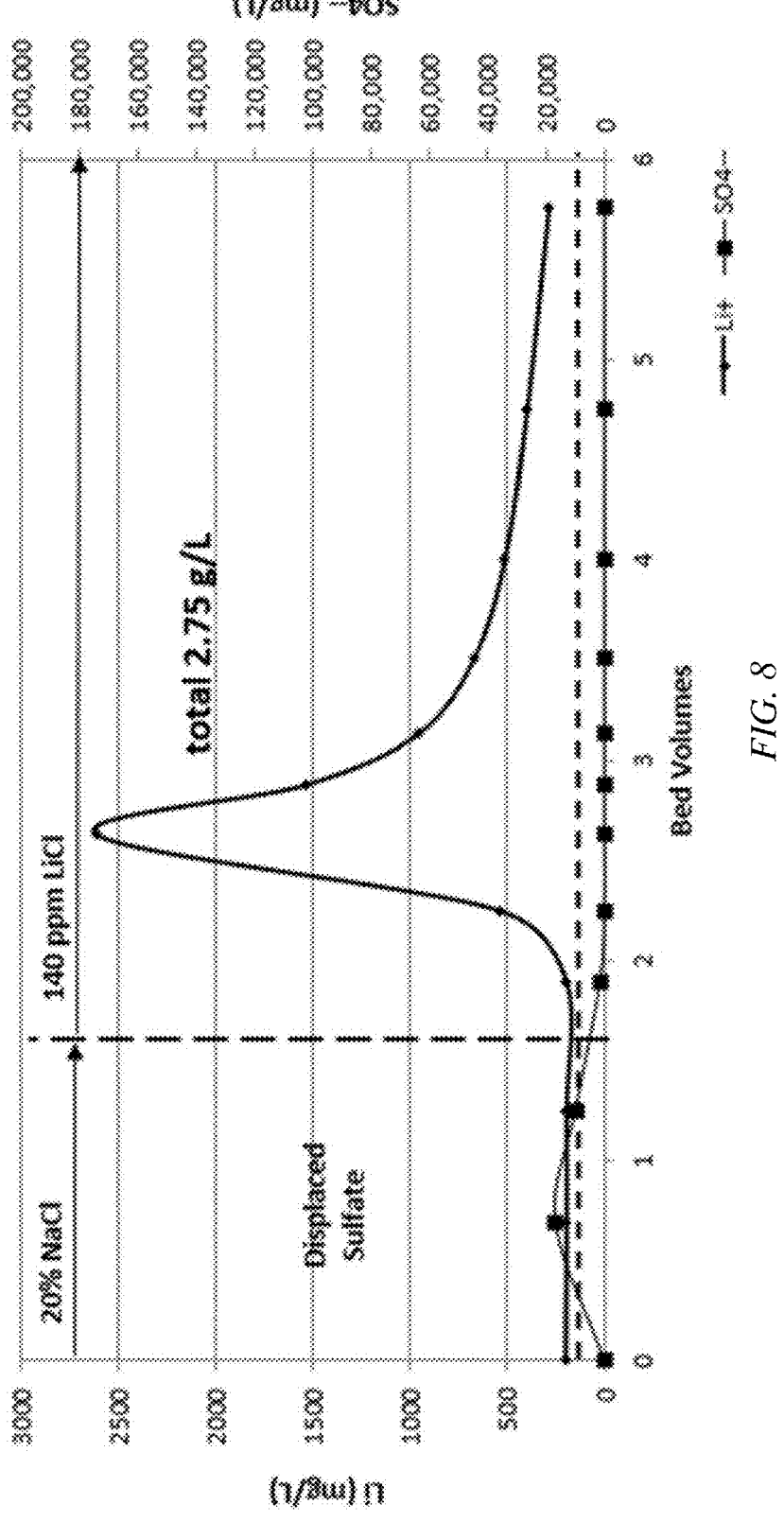
FIG. 8 graphically illustrates an improved lithium elution breakthrough curve showing the increased reversible capacity of the alumina-based adsorbent after sulfate displacement with sodium chloride brine and then eluted using standard deintercalation conditions of low salt aqueous solutions in accordance with an illustrative embodiment of the invention disclosed herein.

The jacketed glass column from Example 1, which was loaded with lithium from the strong sulfate brine solution, was then fed with a 20% NaCl solution with a pH of 6.8 at 74° C. for 1.5 BV at a flow rate of 25 ml/min (6.0 BV/hr) to initiate a sulfate-to-chloride salt metathesis. The breakthrough curve was monitored for sulfate, and a significant self-sharpened wave release of sulfate from the adsorbent was observed, demonstrating the effectiveness of NaCl in displacing bound sulfate from the LADH adsorbent. Next, water having 140 mg/kg lithium as lithium chloride at 74° C. was passed through the adsorbent bed at a flow rate of 20 mL/min (4.8 BV/hr) to elute additional lithium from the LADH adsorbent. As illustrated in FIG. 8, the breakthrough curve indicated an additional 2.2 g/L of lithium was deintercalated after sulfate bound in the LADH adsorbent was displaced with NaCl, resulting in a combined total reversible lithium capacity of 2.75 g/L from Example 1 and Example 2. This result demonstrates the effectiveness of the inventive process and circuit, which clears the way for LADH adsorbents to be used in the selective recovery of lithium from high multivalent solutions, such as those commonly encountered in hard-rock lithium processing and battery metal recycling.

The real-time data, including key parameters, such as flow rates, concentrations, pressures, temperatures, and column performance, can be stored using the computer processor/controller and displayed on an LCD display. In various embodiments, the controller is employed to control process conditions during startup and operation. The controller will typically include one or more memory devices and one or more processors. A processor may include a PID controller, CPU, or computer, analog and/or digital input/output connections, controller boards, etc.

The controller may control all of the activities of the pre-treatment process circuit 100, the DLE process circuit 200, and/or the post-processing process circuit 300. The system controller executes system control software, including sets of instructions for controlling the timing, temperatures, flow rates, and flow paths of the fluid streams and other process parameters. Other computer programs stored on memory devices associated with the controller may be employed in some embodiments.

Typically, there will be a user interface associated with the controller. The user interface may include a display screen, graphical software displays of the apparatus and/or process conditions, and user input devices such as pointing devices, keyboards, touch screens, microphones, etc.

System control logic may be configured in any suitable way. In general, the logic can be designed or configured in hardware and/or software. The instructions for controlling the process control circuitry may be hard coded or provided as software. The instructions may be provided by "programming." Such programming is understood to include logic of any form, including hard coded logic in digital signal processors, application-specific integrated circuits, and other devices which have specific algorithms implemented as hardware. Programming is also understood to include software or firmware instructions that may be executed on a general purpose processor. System control software may be coded in any suitable computer readable programming language.

The computer program code for controlling the temperatures, fluid flows, and other parameters and operations in the process sequence can be written in any conventional computer readable programming language: for example, assembly language, C, C++, Pascal, Fortran, or others. Compiled object code or script is executed by the processor to perform the tasks identified in the program. Also as indicated, the program code may be hard coded.

The controller parameters relate to process conditions, such as, for example, process fluid composition, pH, and concentrations, and process fluid flow rates, temperatures, pressures, and other process parameters and conditions. These parameters are provided to the user and may be entered utilizing the user interface.

The system software may be designed or configured in many different ways. For example, various process circuit component subroutines or control objects may be written to control the operation of the process circuit components necessary to carry out the startup and operational processes in accordance with the disclosed embodiments. Examples of programs or sections of programs for this purpose include process disc and process fluid control code or thermal/recycling control code.

In some implementations, a controller is part of a system, which may be part of the above-described examples. These systems may be integrated with electronics for controlling their operation before, during, and after processing of a process fluid. The electronics may be referred to as the "controller," which may control various components or subparts of the system or systems. The controller, depending on the processing requirements and/or the type of system, may be programmed to control any of the processes disclosed herein, including the delivery of process fluids, temperature settings (e.g., heating and/or cooling), flow path settings, fluid flow rate settings, and other operational components connected to or interfaced with a specific process circuit.

Broadly speaking, the controller may be defined as electronics having various integrated circuits, logic, memory, and/or software that receive instructions, issue instructions, control operation, enable cleaning operations, enable endpoint measurements, and the like. The integrated circuits may include chips in the form of firmware that store program instructions, digital signal processors (DSPs), chips defined as application specific integrated circuits (ASICs), and/or one or more microprocessors, or microcontrollers that execute program instructions (e.g., software). Program instructions may be instructions communicated to the controller in the form of various individual settings (or program files), defining operational parameters for carrying out a particular process.

The controller, in some implementations, may be a part of or coupled to a computer that is integrated with, coupled to the system, otherwise networked to the system, or a combination thereof. For example, the controller may be in the "cloud" or all or a part of a host computer system, which can allow for remote access to the lithium or mineral processing. The computer may enable remote access to the system to monitor current progress of startup and processing operations, examine a history of past startup and processing operations, examine trends or performance metrics from a plurality of startup and processing operations, to change parameters of current processing, to set processing steps to follow a current processing, or to start a new process. Thus, as described above, the controller may be distributed, such as by comprising one or more discrete controllers that are networked together and working towards a common purpose, such as the processes and controls described herein.

For the purposes of this disclosure, the term "at least" followed by a number is used herein to denote the start of a range beginning with that number (which may be a range with an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%.

Terms of approximation (e.g., "about", "substantially", "approximately", etc.) should be interpreted according to their ordinary and customary meanings as used in the associated art unless indicated otherwise. Absent a specific definition and absent ordinary and customary usage in the associated art, such terms should be interpreted to be ±10% of the base value.

As used herein, the term "fluidly connected" means connected by a fluid transfer conduit or any other method that permits fluid transfer, with or without intervening elements, such as, without limitation, containers, filters, devices, pumps, valves, etc. A non-limiting example, two tanks or vessels may be "fluidly connected" if they are connected to each other through a pipe or tube, even if a pump, manifold, valve, or other device is placed inline between the vessels. Two elements are considered to be "fluidly connected" even though there is no pipe or tubing making the connection if the first element leaks or otherwise drains, overflows, siphons, or transfers into the second element, though there may be no actual physical connection between the two elements in the form of a pipe or tube.

As used herein, the term "in fluid communication with" means that a fluid-carrying or fluid-transporting member (e.g., vessel, tank, pump, pipe, tubing, disc, valve, channel, port, etc.) is coupled to another fluid-carrying or fluid-transporting member so as to permit the fluid to flow, leak, or otherwise migrate from one member to the other. In reference to a process or circuit, the term "downstream" means a later in the direction of general process and/or fluid flow, and "upstream" means earlier in the direction of general process and/or flow.

Although an overview of the disclosed subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

What is claimed:

1. A process for direct lithium extraction, comprising the steps of:

feeding a lithium-bearing feed solution comprising lithium ions and residual impurities to a direct lithium extraction process circuit having a plurality of process zones;

contacting the lithium-bearing feed solution with an alumina-based lithium selective adsorbent in an adsorption loading process zone of the direct lithium extraction process circuit to form a lithium-loaded adsorbent bed;

displacing the residual impurities from the lithium-loaded adsorbent bed in a salt wash displacement process zone of the direct lithium extraction process circuit using a salt wash solution, the salt wash solution comprising a chloride salt;

displacing the salt wash solution from the lithium-loaded adsorbent bed in a lithium product elution process zone of the direct lithium extraction process circuit with an eluate solution to recover lithium and purify the recovered eluate to yield a lithium eluate having an increased lithium to impurity ratio; and recycling at least a portion of the displaced salt wash solution containing the displaced residual impurities into the direct lithium extraction process circuit.

2. The process of claim 1, further comprising the steps of:

a) displacing the feed solution from the lithium-loaded adsorbent bed in the salt wash displacement zone using an elution volume of a lithium-containing eluant solution or a portion of a lithium product eluate from the elution zone to a monovalent solution vessel;

b) displacing the residual impurities from the adsorbent bed in the salt wash displacement zone using the salt wash solution from the monovalent solution vessel;

c) displacing an elution volume of the salt wash solution from the adsorbent bed in a brine displacement process zone to a combined feed solution vessel;

d) passing a combined feed solution/salt wash solution through the adsorption loading process zone with a predetermined contact time sufficient to completely or almost completely load the adsorbent bed in the adsorption loading process zone and forming a lithium-depleted raffinate;

e) displacing a latent eluate solution from the adsorbent bed in a strip displacement process zone with a portion of the lithium-depleted raffinate from the adsorption loading process zone and into the lithium product elution process zone;

f) flowing a lithium strip solution through the lithium product elution process zone stripping a portion of the lithium ions adsorbed on the adsorbent bed in the lithium product elution process zone; and g) collecting a portion of the eluate having an increased lithium to impurity ratio.

3. The process of claim 2 further comprising:

the salt displacement process zone positioned upstream with respect to fluid flow of and in fluid communication with the brine displacement process zone, wherein the adsorbent beds in the salt displacement process zone are configured as monads or dyads in a series of 1, 2, 3, 4, or 5 absorbent bed sets;

the brine displacement process zone positioned upstream with respect to fluid flow of and in fluid communication with the adsorption loading process zone, wherein the adsorbent beds in the brine displacement process zone are configured as monads in a series of 1, 2, 3, 4, or 5 adsorbent bed sets;

the adsorption loading process zone positioned upstream with respect to fluid flow of and in fluid communication with a strip displacement process zone, wherein the adsorbent beds in the adsorption loading process zone are configured as monads, dyads, triads, tetrads, pentads, hexads, or a combination thereof in a series of 1, 2, 3, 4, 5, or 6 adsorbent bed sets;

the strip displacement process zone positioned upstream with respect to fluid flow of and in fluid communication with the lithium product elution process zone, wherein the adsorbent beds in the strip displacement process zone are configured as monads in a series of 1, 2, or 3 adsorbent bed sets; and the lithium product elution process zone in fluid communication with the salt displacement process zone, wherein the adsorbent beds in the lithium product elution process zone are configured as monads, dyads, triads, or a combination thereof in a series of 1, 2, 3, or 4 adsorbent bed sets.

4. The process of claim 1, wherein the feed solution comprises one or a blend of natural or synthetic lithium-bearing brines or solutions a continental brine, a geothermal brine, a salar brine, an oil field or produced water brine, seawater, a salt lake brine, brine or leachate solutions from dissolved salts, ore, hard rock, spodumene, clay, or other lithium mining and beneficiation, solutions from battery recycling processes, mother liquors, pregnant leach or liquor solutions (PLS), or a combination or blend thereof.

5. The process of claim 1, wherein the chloride salt comprises sodium chloride, potassium chloride, or both.

6. The process of claim 5, wherein the chloride salt comprises about 5 wt % to about 31 w1% sodium chloride, potassium chloride, or a blend thereof.

7. The process of claim 6, wherein the chloride salt comprises about 10 wt % to about 30 w1% sodium chloride, potassium chloride, or a blend thereof.

8. The process of claim 6, wherein the sodium chloride comprises about 5% to about 27 wt % sodium chloride and wherein the potassium chloride comprises about 5% to about 31 wt % potassium chloride.

9. The process of claim 1, wherein the recycling step further comprises recycling at least a portion of the displaced salt wash solution containing the displaced impurities to the lithium-bearing feed solution, a chloride solution tank, or a combination thereof.

10. The process of claim 1, wherein the alumina-based lithium selective adsorbent comprises a lithium aluminum layered double hydroxide.

11. The process of claim 1, further comprising the steps of monitoring one or more process parameters of the fluid flow streams before, during, and/or after each process zone, and regulating the fluid flow streams through the direct lithium extraction process circuit in response to one or more of the monitored process parameters.

12. The process of claim 11, wherein the process parameters comprise solution concentration, conductivity, pressure, temperature, column performance, pH, or a combination thereof.

13. The process of claim 1, wherein the direct lithium extraction process circuit comprises a fixed bed, a simulated moving bed, a continuous countercurrent adsorption-desorption process circuit, or a continuous countercurrent ion exchange process circuit.

14. The process of claim 13, wherein the continuous countercurrent adsorption-desorption process circuit or the continuous countercurrent ion exchange process circuit comprises a rotary multiport valve.

15. The process of claim 1 further comprising the steps of:
treating the lithium-bearing feed solution in a pre-treatment process circuit to remove select impurities; and/or
processing the lithium eluate in a post-processing process circuit to remove select impurities.

16. The process of claim 1 further comprising the steps of feeding the feed solution to a pre-treatment process circuit upstream of the direct lithium extraction process circuit, the step of feeding the lithium eluate to a post-processing process circuit downstream of the direct lithium extraction process circuit, or both steps.

17. The process of claim 1 further comprising the step of generating the salt wash solution by concentrating and/or purifying the feed solution, recirculating a post-processing concentrated salt stream, dissolving solid makeup salt, purifying salts from downstream processing, or intermediates or combinations thereof.

* * * * *